(12) United States Patent
Alkhatib et al.

(10) Patent No.: US 6,532,217 B1
(45) Date of Patent: Mar. 11, 2003

(54) SYSTEM FOR AUTOMATICALLY DETERMINING A NETWORK ADDRESS

(75) Inventors: Hasan S. Alkhatib, Saratoga, CA (US); Bruce C. Wootton, Palo Alto, CA (US)

(73) Assignee: IP Dynamics, Inc., San Jose, CA (US)

( * ) Notice: Subject to any disclaimer, the term of this patent is extended or adjusted under 35 U.S.C. 154(b) by 0 days.

(21) Appl. No.: 09/342,406

(22) Filed: Jun. 28, 1999

Related U.S. Application Data
(60) Provisional application No. 60/091,000, filed on Jun. 29, 1998.

(51) Int. Cl.[7] .................................................. H04J 3/24
(52) U.S. Cl. ....................................... 370/252; 370/254
(58) Field of Search ........................ 370/252, 254–258, 370/389, 392, 397, 399, 437, 462, 401, 447; 709/220, 222, 224; 717/139

(56) References Cited

U.S. PATENT DOCUMENTS

| | | | | |
|---|---|---|---|---|
| 4,689,786 A | * | 8/1987 | Sidhu et al. ................. 370/255 |
| 5,150,464 A | * | 9/1992 | Sidhu et al. ................. 709/222 |
| 5,159,592 A | * | 10/1992 | Perkins ........................ 370/401 |
| 5,745,699 A | * | 4/1998 | Lynn et al. .................. 709/224 |
| 5,781,552 A | * | 7/1998 | Hashimoto .................. 370/447 |
| 5,826,014 A | | 10/1998 | Coley et al. |
| 5,835,720 A | * | 11/1998 | Nelson et al. ............... 709/224 |
| 5,898,830 A | | 4/1999 | Wesinger, Jr. et al. |
| 6,038,394 A | * | 3/2000 | Layes et al. ................. 717/139 |
| 6,119,171 A | | 9/2000 | Alkhatib |
| 6,167,454 A | * | 12/2000 | Nakatsugawa .............. 709/220 |
| 6,215,774 B1 | * | 4/2001 | Knauerhase et al. ........ 370/252 |

OTHER PUBLICATIONS

RFC1631 The IP Network Address Translator (NAT), May 1994.

* cited by examiner

Primary Examiner—Salvatore Cangialosi
(74) Attorney, Agent, or Firm—Vierra Magen Marcus Harmon & DeNiro LLP

(57) ABSTRACT

The present invention provides for a system for automatically determining a network address. A new node starting on the network will solicit addresses from other nodes on the subnet. The addresses received are stored in a database. The address stored in the database will be reviewed in order to determine a subnet mask. The new node will choose a host number, based on the subnet mask, that is unique among the addresses in the database. The chosen unique host number is combined with the subnet number to form the new node's network address. One example of a network address is an IP version 4 address.

39 Claims, 5 Drawing Sheets

SYSTEM FOR AUTOMATICALLY DETERMINING A NETWORK ADDRESS

PRIORITY DATA

This application claims the benefit of U.S. Provisional Application No. 60/091,000, filed Jun. 29, 1998.

BACKGROUND OF THE INVENTION

1. Field of the Invention

The present invention is directed to a system for automatically determining a network address.

2. Description of the Related Art

Most machines on the Internet use TCP/IP (Transmission Control Protocol/Internet Protocol) to send data to other machines on the Internet. To transmit data from a source to a destination, the Internet Protocol (IP) uses an IP address. An IP address is four bytes long, which consists of a network number and a host number. IP addresses are usually written using four numbers separated by periods; where each number can have one, two or three digits (e.g. 198.68.70.1).

There are at least three different classes of networks currently in use: Class A, Class B and Class C. Each class has a different format for the combination of the network number and the host number in the IP addresses. A Class A address includes one byte to specify the network and three bytes to specify the host. The first bit of a Class A address is a 0 to indicate Class A. A Class B address uses two bytes for the network number and two bytes for the host number. The first two bits of the Class B address are 10 to indicate Class B. The Class C address includes three bytes to specify the network and one byte for the host. The first three bits of the Class C network address are 110 to indicate Class C.

In order for a device to communicate on the Internet it must have an IP address. Currently, a device on a network is manually configured with an IP address by an administrator. Manual configuration is a reasonable solution for a computer network used by a large organization which has administrators on staff. However, small private networks may not have access to an administrator. For example, it is contemplated that as use of the Internet grows, many appliances or other devices in the home will have access to the Internet. Some examples include computers, videotape machines, home security equipment, kitchen appliances, household lights, etc. One advantage of accessing these devices over the Internet is remote control. For example, the user who is away from the home, but has access to the Internet, can program a videotape machine to record a television program, can turn on the lights at night or can turn on a home security system. Most households would not employ a system administrator. Therefore, there needs is to be a means to easily assign an IP address to a household device or other network device (e.g. including a computer for a small company) that will have access to the Internet.

One means for assigning IP addresses is to use the Bootstrap Protocol (BOOTP). BOOTP is a client/server program that allows a client to request configuration information from a designated server. BOOTP uses UDP and IP. BOOTP can be used to assign an IP address, the address of a default gateway, address of a bootstrap image server, vendor specific hardware information and subnet masks.

Another means for assigning a network addresses is to use the Dynamic Host Configuration Protocol (DHCP). DHCP is designed to supply hosts with configuration parameters, lease dynamically allocated IP addresses and interoperate with BOOTP. DHCP supports the assignment of permanent IP addresses; the assignment of temporary IP addresses; and the assignment of IP addresses by network administrator. DHCP works by having a client machine that needs an IP address sending a message over the network. A DHCP server responds by offering an IP address and a subnet mask.

The problem with DHCP and BOOTP is that both protocols require a server on the network to provide the client with an IP address. Many small networks do not have such a server. For example, it would not be economical for a household or small business entity to purchase a DHCP or a BOOTP server.

Another solution that has been proposed is a new version of the Internet Protocol called IPv6 (Internet Protocol version 6). IPv6 provides a procedure for a device to connect to a subnet and automatically acquire an IP address. The IPv6 procedure for connecting to a subnet takes advantage of the behavior of IPv6 routers which advertise the subnet mask. A device forms an IPv6 address by appending an already known unique interface token to a well known link local prefix. From the address configurations perspective, an interface token is a bit string of known length. The exact length of an interface token and the way it is created is defined by IPv6. In many cases, the token will be the same as the interface's link layer address. The link local prefix is based on the subnet mask advertised by the router. Before the new address can be used by a device, there must be an attempt to verify that the tentative address is not already in use by another node. If it is determined that the tentative address is not unique, auto-configuration stops and manual configuration is required.

IPv6 is not compatible with the existing Internet Protocol, IP version 4 (IPv4). For example, IPv6 has a longer address than IPv4. Additionally, the IPv6 header is different than the IPv4 header. Because IPv6 is not compatible with IPv4, almost all routing equipment on the Internet must be replaced with updated equipment that is compatible with IPv6. Such widespread replacement of legacy equipment is enormously expensive.

Furthermore, to utilize the auto-configuration process of IPv6, all devices on the subnet must be IPv6 devices. IPv6 has not been adopted as a standard yet. Thus, there are few devices that can operate using IPv6.

Another solution provided is the Apple Talk protocol from Apple Computer, Inc. Apple Talk uses a dynamic node ID assignment scheme. With a dynamic node ID assignment, a node does not have a fixed unique address. When a node is activated on the network, the node makes a guess at its node ID, either by extracting this number from some form of long term memory or by generating a random number. The node then verifies that this guessed number is not already in use on that network by sending out an inquiry control packet to the guessed node address and waiting for an acknowledgment. If the guessed node ID is in use, then the node using it will receive the inquiry control packet and respond with an acknowledged control packet. The reception of the acknowledged control packet notifies the new node that its guessed node ID is already in use. The node must then repeat the process with a different guess.

For a nonextended network, Apple Talk appends the unique node ID to a node's network number to form an address. The network number is obtained from a router using a request packet. The acquisition of an Apple Talk network number from the router is accomplished by using a provisional address. Using the provisional address, the node talks to a router to find out the actual network number range in which its network number should be chosen. The node's final network number and the node ID are saved in long term storage for the next time the node starts up.

A problem with the Apple Talk protocol is that it is not used to provide an IPv4 address, which is the addressing scheme used on the Internet. Furthermore, the Apple Talk protocol uses a fixed size host number rather than a variable sized host number determined from a subnet mask. Additionally, the Apple Talk client uses a random number as its node ID rather than using an intelligent and efficient scheme. Finally, a router is needed to determine the complete address.

A problem with the above described solutions is that they either require a system administrator or a server. Most private homes or small businesses cannot afford either. Therefore, a system is needed to assign a network address to a device starting on a network such that the system does not require a system administrator or a server.

SUMMARY OF THE INVENTION

The present invention, roughly described, provides for a system for automatically determining an address for a device on a network. A new node starting on the network will solicit one or more network addresses from one or more nodes on the network. Using those addresses solicited, the new node will determine a seemingly unique address and verify that no other node on the network is using that address.

In one embodiment, the step of soliciting one or more addresses includes simultaneously soliciting all of the nodes on a subnet. The method further includes the steps of listening for responses from the solicited nodes, and storing the network addresses received in the responses. Each of the network addresses includes a host number. The step of determining a seemingly unique address includes the steps of determining a subnet number and a temporary subnet mask, and choosing a new host number that is different from any stored host numbers. The seemingly unique address includes the subnet number and the new host number. After verifying that the new chosen address is unique, the system will continue to monitor the network for conflicts with that new address. If a conflict is found, a new address is determined.

In one embodiment, the step of soliciting one or more network addresses includes sending an ICMP Echo Request, with a broadcast address as the source address. The step of verifying can be accomplished by sending an ARP message on the network such that the destination address of the ARP message is the newly chosen address. In one alternative, the system can determine the subnet mask, the address of a DNS server and/or the address of the gateway for the subnet.

The system of the present invention can be implemented using software stored on a processor readable storage medium. Alternatively, the invention can be implemented in specific hardware, or a combination of hardware and software, designed to carry out the methods described herein.

These and other objects and advantages of the invention will appear more clearly from the following detailed description in which the preferred embodiment of the invention has been set forth in conjunction with the drawings.

DETAILED DESCRIPTION

Figure 1:
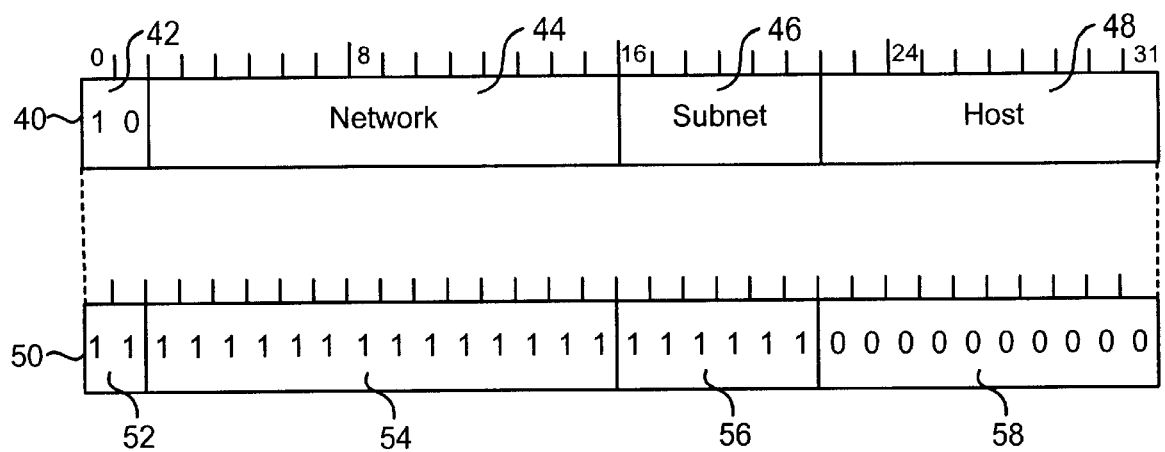
FIG. 1 depicts an example of a subnet mask.

As discussed above, each IP address includes a network number and a host number. All hosts (also called nodes) in a network must have the same network number. To facilitate administration, many networks are split into several parts for internal use but still act like a single network to the outside world. These parts are called subnets. A subnet is identified by splitting the host number into a subnet number and a host number. By dividing a network into subnets, an organization or a group of organizations can make more efficient use of the IP address space. For example, many organizations can share a class B network address; however, the network will be broken up into a separate subnet for each organization. Alternatively, a growing company can start out with a class B address and just number the host 0–255. When a second LAN (Local Area Network) is set up with the company, it can split the 16 bit host number into a 6 bit subnet number and a 10 bit host number as shown in FIG. 1. This split allows 62 LANs, each with up to 1022 hosts. In FIG. 1, the address space is depicted by block 40. The first field 42 includes two bits which indicate a class B network. Field 44 includes fourteen bits which make up the network number. Field 46 is the six bit subnet number. Field 48 is the ten bit host number.

To see how subnets work, it is necessary to explain how IP packets are processed in a router. Each router has a table listing some number of (network, 0) IP addresses and some number of (this network, host) IP addresses. The type of address (network, 0) tells how to get to distant networks. The second type of address (this network, host) tells how to get to local hosts. Associated with each table entry is the network interface to use to reach the destination.

When an IP packet arrives, its destination address is looked up in the routing table. If the packet is for a distant network, it is forwarded to the next router using the network interface given in the table. If it is a local host (e.g., on the router's LAN), it is sent directly to the destination. If the network is not present, the packet is forwarded to a default router with more extensive tables. This process means that each router need only keep track of other networks and local hosts, not (network, host) pairs, greatly reducing the size of the routing table.

When subnetting is introduced, the routing tables are changed, adding entries of the form (this network, subnet, 0) and (this network, this subnet, host). Thus, a router on subnet K knows how to get to all other subnets and also how to get to all hosts on subnet K. It does not have to know the details about hosts on other subnets. In fact, all that needs to be changed is to have each router do a boolean AND with the network's subnet mask to get rid of the host number and look up the resulting address and its table (after determining which network class it is). The subnet mask has the same bit width as the IP address. Each bit in the subnet mask corresponds to a bit in the IP address. For each bit in the IP address that corresponds to the network number or subnet number, the subnet mask is a 1. For each bit that corresponds to a host number, the subnet mask is a 0. In FIG. 1, portion 52 of subnet mask 50 corresponds to portion 42 of address 40, portion 54 of subnet mask 50 corresponds to portion 44 of address 40, portion 56 of subnet mask 50 corresponds to portion 46 of address 40, and portion 58 of subnet mask 50 corresponds to portion 48 of address 40. Since portions 42, 44 and 46 of address 40 correspond to the network number and subnet number, all of the bits of portions 52, 54 and 56 of subnet mask 50 are set at 1. Since portion 48 of address 40 corresponds to the host number, portion 58 of subnet mask 50 is set to 0. In addition to helping the router use its tables, the subnet mask also is a reference to tell a router or any other device which bits it will use for the host number so that new host numbers can be assigned accordingly.

Figure 2:
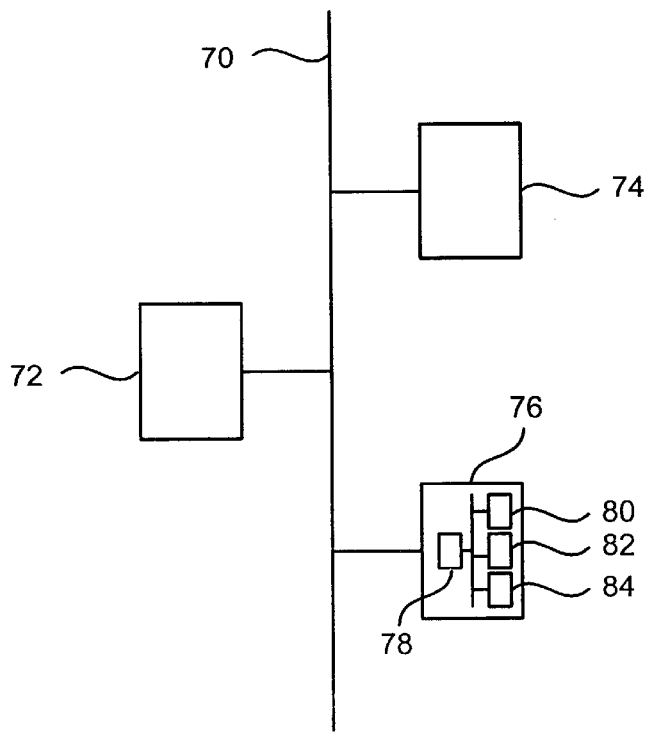
FIG. 2 is a block diagram of an exemplar subnet.

FIG. 2 depicts an exemplar subnet 70. FIG. 2 shows three devices 72, 74 and 76 connected to subnet 70. It is contemplated that a subnet can include more or less than three devices. The devices connected to a subnet could include a computer, a storage device (e.g. a disk drive) or any other appliance or device that has an appropriate network interface. The drawing of FIG. 2 shows the internal components of device 76. In one embodiment, device 76 could be a videotape machine, home security system, home lighting system, computer, disk drive, etc. Device 76 includes a network interface 78. In one embodiment, network interface 78 could include a network card (e.g. Ethernet card), a modem, a router, etc. In communication with network interface 78 is processor 80, which can be any suitable processor known in the art. The exact implementation of the processor is not important to the present invention as long as it can carry out the functions described below. In communication with processor 80 are memory 82 and appliance functionality 84. Memory 82 can be RAM, EPROM, flash memory, disk, etc. In one embodiment, memory 82 includes more than one memory device. Appliance functionality 84 is the core functionality of the appliance. For example, if device 76 is a videotape machine, then appliance functionality 84 is the portion of the device that does the videotaping. If device 76 is a home security system, then appliance functionality 84 is the actual security hardware and software. Any of the devices on the subnet may also have a display and an input device (e.g. keypad, keyboard, pointing device, buttons, etc.) The goal of the present invention to allow device 76 to be connected to subnet 70 and automatically obtain a network address. In the preferred embodiment, the network address sought is an IP address. In one embodiment, the IP address is an IPv4 address. However, the present invention can be used for other protocols other than the Internet Protocol.

Figure 3A:
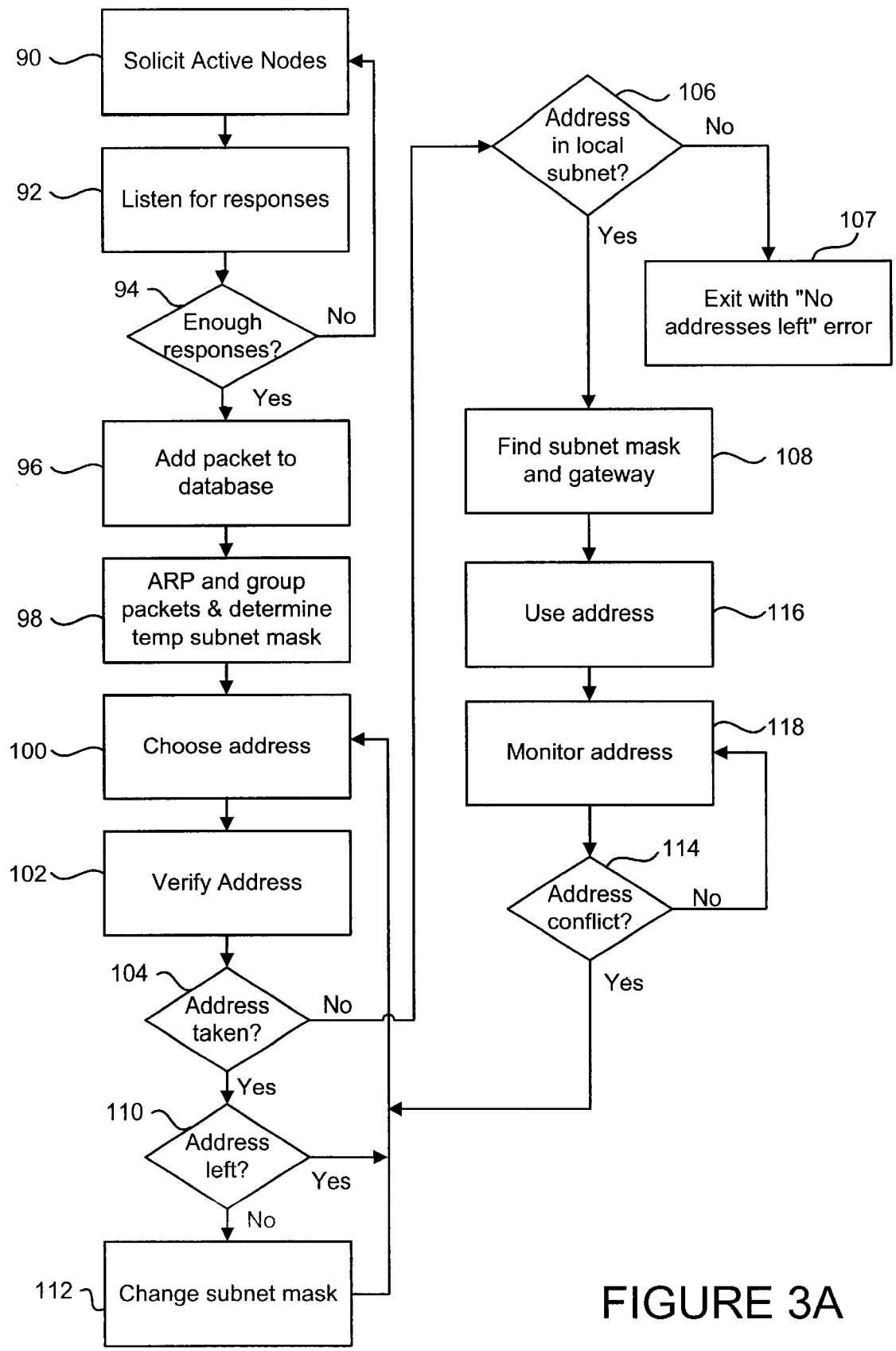
FIG. 3A is a flow chart describing the method of automatically assigning a network address using the present invention.

FIG. 3A is a flow chart describing the steps performed for automatically obtaining a network address for a device on a network. In step 90, device 76 solicits active nodes on the subnet. That is, device 76 will send a message to all of the devices asking the devices to send their IP addresses to device 76. Step 90 is typically performed the first time device 76 starts-up on the subnet. In one embodiment, device 76 will solicit active nodes by broadcasting a packet on the subnet to solicit responses from all active nodes. An example of such a packet is an ICMP Echo Request packet.

ICMP is a protocol used to test and control the Internet. ICMP uses the basic support of IP as if it were a higher level protocol; however, ICMP is actually an integral part of IP. ICMP messages are sent in several situations. For example, when a packet cannot reach its destination, when a gateway does not have the buffering capacity to forward a packet and when the gateway can direct the host to send traffic on a shorter route. The Internet Protocol is not designed to be absolutely reliable. The purpose of the ICMP control messages is to provide feedback about problems in the communications environment, not to make the Internet Protocol reliable.

Figure 4:
FIG. 4 is a block diagram depicting an IP packet.
Figure 5:
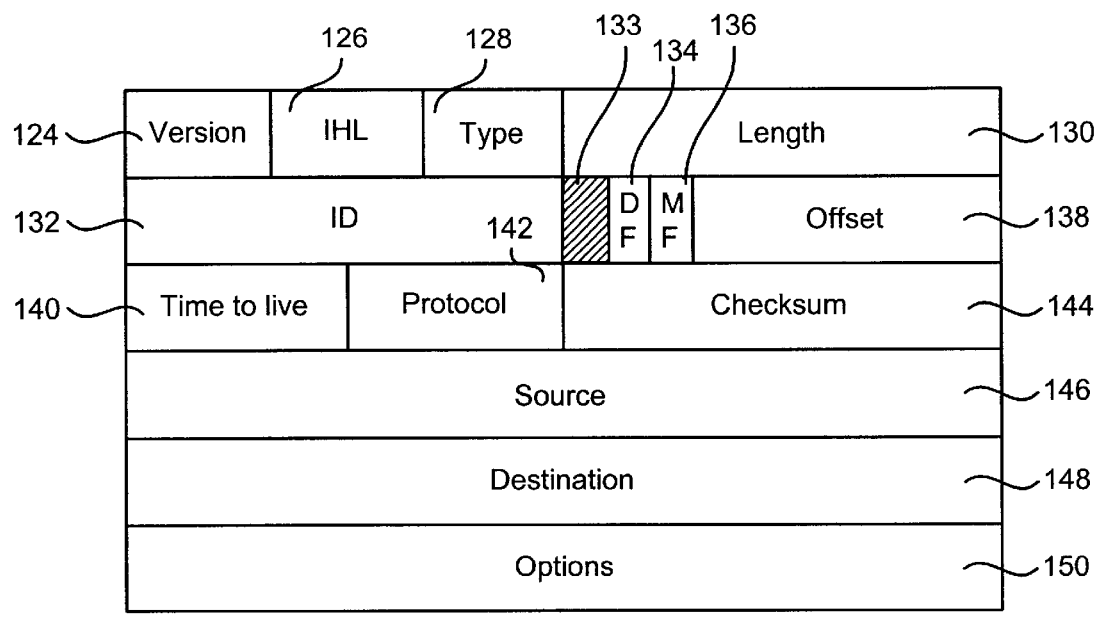
FIG. 5 shows a header for an IP packet.

ICMP messages are sent using the basic IP packet. A basic IP packet, depicted in FIG. 4, includes a header 120 and a data portion or payload 122. The format of an IP header 120 is shown in FIG. 5. FIG. 5 shows six rows making up the header. Each row is 32 bits wide. The first five rows of the header comprise a 20 byte fixed portion of the header. The last row of the header provides a variable sized Options section 150. Version field 124 keeps track of which version of the protocol the packet belongs to. The current version used on the Internet is version 4. IHL field 126 describes the length of the header in 32 bit words. Type field 128 indicates the type of service requested. Various combinations of reliability and speed are possible. Length field 130 includes the size of the packet, including both the header and the data. Identification field 132 is needed to allow the destination host to determine which segment the received fragment belongs to. All fragments of a segment contain the same identification value. Next comes three flags, which include an unused bit 133 and then two 1 bit fields 134 and 136. DF field 134 stands for don't fragment. It is an order to the routers not to fragment the segment because the destination is incapable of putting the pieces back together again. MF field 136 stands for more fragments. All fragments except for the last one have this bit set. Fragment offset field 138 indicates where in the current segment this fragment belongs. Time to Live field 140 is used to limit packet lifetime. It is supposed to count time in seconds, allowing a maximum life time. In practice, it may count hops. The time is decremented on each hop by a router. When the time to live hits 0, the packet is discarded and a warning is sent back to the source using an ICMP packet. This feature prevents packets from wandering around forever. Protocol Field 142 indicates which transport layer type is to receive the segment. TCP is one possibility, UDP is another. The present invention is not limited to any particular transport layer protocol. Checksum field 144 verifies the header. One method for implementing a checksum is to add up all 16 bit half words as they arrive and take the ones compliment of the result. Note that the checksum must be recomputed at each hop because the Time to Live field 40 changes. Source field 146 indicates the IP address for the source of the packet and destination field 148 indicates the IP address for the destination of the packet. Options field 150 is a variable length field designed to hold other information. Currently, options used on the Internet indicate security, suggested routing path, previous routing path and time stamps, among other things.

Figure 6:
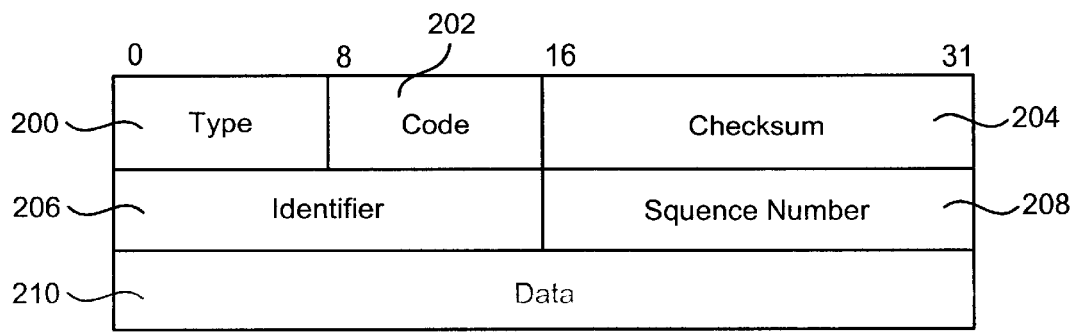
FIG. 6 depicts the format of an ICMP message.

The ICMP message is sent inside the data portion or payload 122 of the IP packet. FIG. 6 depicts the format of an ICMP Echo Request or Echo Reply message. Type field 200 of the ICMP message is set to 8 for Echo Request message and 0 for Echo Reply message. Code field 202 is one byte and is set to 0 for Echo Request messages and Echo Reply messages. sum. The two byte identifier field 206 can be used to identify matching Echo Requests and replies. Similarly, the two byte sequence number field 208 can also be used to match Echo Requests and replies. For example, identifier 206 might be used like a port in TCP to identify a session and a sequence number 208 might be incremented on each Echo Request sent. The node processing the Echo Request returns the same values in the Echo Reply. Data 210 received in an Echo Request message must be returned with the Echo Reply message.

In one embodiment of step 90 of FIG. 3A, device 76 sends out a broadcast ICMP Echo Request to the local subnet to see what IP addresses are available. Not all devices are required to respond to a broadcast ICMP Echo Request; therefore, device 76 cannot guarantee that every device will respond. Since device 76 does not have an IP address before sending the ICMP echo request, device 76 would use the broadcast address 255.255.255.255 as the source address 146.

In step 92 of FIG. 3, device 76 listens for responses to its ICMP Echo Request. Each ICMP Echo Response will identify the source of the response. Therefore, for each response received, device 76 knows that there is a device that is active on the subnet using that particular received IP address. Although it is hoped that device 76 will receive multiple responses in step 92, it cannot be guaranteed because the number of active nodes on a network cannot be guaranteed and the nodes that are active are not required to respond. After a predetermined amount of time, therefore, device 76 determines whether a sufficient number of responses have been received (step 94). In one implementation, this time is two minutes. The threshold for deciding the test of step 94 can be determined experimentally. In one embodiment, the number of responses being deemed sufficient is at least two packets where the packets are from different nodes. In one alternative, if the system received a sufficient number of responses, it does not wait a predetermined amount of time.

If a sufficient number of responses are received then the system adds the information for each response into a database in step 96. The information added to the database would include the source and destination IP addresses of any observed packets. In one alternative, the database might also include an Ethernet identification for each device. In one alternative, step 96 can be combined into step 92. That is, as the system receives a response, that data is automatically placed into the database.

After putting all responses in the database, the system determines a temporary subnet mask in step 98. The step of determining the subnet mask includes determining the length of the host ID. As part of the process of determining the subnet mask, the system can determine the subnet number and network number. In usage, sometimes the "subnet number" refers to both the subnet number and network number as a combination. The subnet mask determined in step 98 is an initial determination and can be updated as indicated below.

One method for determining the temporary subnet mask is to look at all the IP addresses in the database referenced in step 96. An ARP request is sent for each IP address in the database. A group is formed from the members of all responding nodes. The local subnet mask consists of all the leading (or most significant) bits that are in common among all the addresses stored in the group. The bits that are in common represent at least the network number and subnet number. For example, assume the following three addresses are stored in the group: 198.68.70.4, L4 198.68.70.8, and 198.68.70.11. The subnet mask assumed in step 98 would be 255.255.255.240 because the leading (most significant) 28 bits are the same for all three stored addresses. The network number and subnet number is 198.68.70.0. If there is only one address in the group, step 98 would assume that the subnet mask was all the bits except for the least significant bit (e.g. 255.255.255.254).

In step 100, device 76 chooses a seemingly unique address. The address chosen includes the subnet number and network number as discovered in step 98. The address is "seemingly unique" because the system believes it to be unique at the time it is chosen, but it may turn out that the address is already taken. Device 76 selects a host number by choosing the lowest host number that is not used by an existing active node on the subnet. This is performed by scanning the list of addresses stored in step 96. The new host address can be selected by choosing the lowest host number that is not in the responding group and is not all zeros or all ones (as these two addresses correspond to the network and broadcast addresses, respectively). Thus, in the above example where the responding group includes three addresses 198.68.70.4, 198.68.70.8 and 198.68.70.11, the network number and subnet number is 198.68.70.0 and there are 16 possible host numbers (0–15). Since host numbers 4, 8 and 11 are already stored in the responding group, device 76 would choose the lowest host number not stored, which in this case would be 1. Thus, step 100 would include choosing an address of 198.68.70.1.

In step 102, device 76 verifies that the number it chose is unique. Remember that in steps 90 and 92 when an ICMP echo request was sent out, it is not guaranteed that all devices replied. Thus, it is possible that there is a device that is active on the subnet using the host number selected in step 100. Thus, device 76 sends out a message attempting to verify whether any other node is using the address chosen in step 100. One means for performing step 102 is to generate and send out an ARP packet with a destination address equal to the address chosen in step 100 and the source address being the broadcast address. A discussion of an ARP packet follows.

Although every machine in the Internet has (or should have) an IP address, these addresses alone cannot be used for sending packets because the data link layer of the network (e.g. Ethernet) does not understand IP addresses. Most hosts are attached to a LAN by an interface board that only understands LAN addresses (also called a MAC address). For example, every Ethernet board comes equipped with a 48 bit Ethernet address. An Ethernet address is one type of a MAC address. Manufacturers of Ethernet boards request a block of addresses from a central authority to ensure that no two boards have the same address. The boards send and receive frames based on a 48 bit Ethernet address. For one entity to transmit data to another entity on the same LAN using an Ethernet address, the entity can use the Address Resolution Protocol (ARP). This protocol includes the sender broadcasting a packet onto the Ethernet asking who owns the particular IP address in question. That packet will arrive at every machine on the Ethernet and each machine will check its IP address. The machine that owns the particular IP address will respond with its Ethernet address. The sending machine now has the Ethernet address for sending data directly to the destination on the LAN. At this point, the sender can build an Ethernet frame addressed to the destination, put the packet into the payload field of the frame and dump the frame onto the Ethernet. The Ethernet board on the destination receives the frame, recognizes it is a frame for itself, and extracts the IP packet from the frame.

Figure 7:
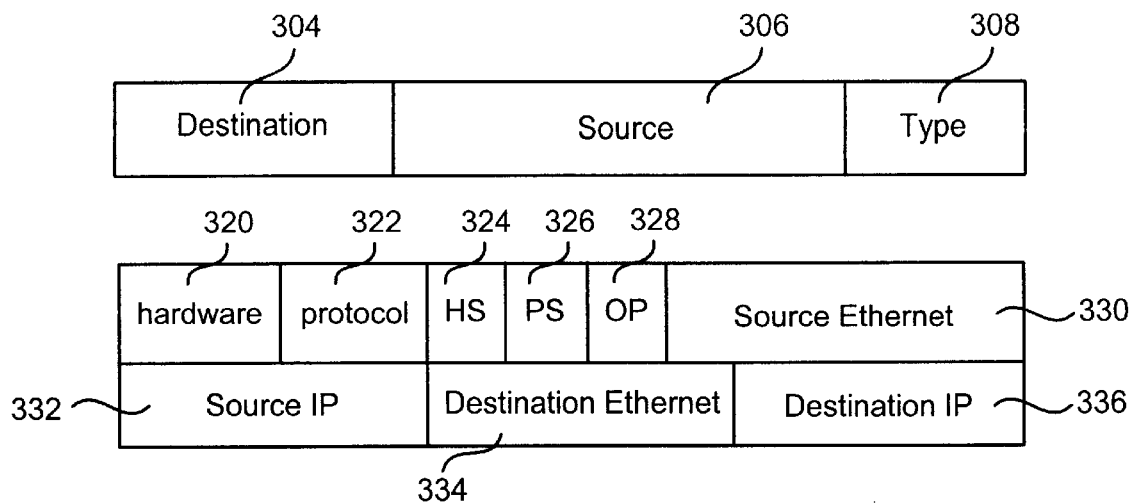
FIG. 7 depicts the format of an ARP message.

FIG. 7 depicts the structure of an ARP packet. Fields 304, 306 and 308 are part of the Ethernet header. Field 304 is the Ethernet address of the destination. Field 306 is the Ethernet address of the source and field 308 indicates the frame type. In step 102, destination address 304 is the broadcast address FF:FF:FF:FF:FF:FF, and the source address in field 306 is the Ethernet address of the Ethernet board 78 for device 76. Frame type 308 is set to the value 0x0806.

Fields 320–336 represent the ARP packet that is transmitted in the payload portion of the Ethernet frame. Field

320 of the ARP packet is two bytes and indicates the hardware type of the network (e.g. Ethernet, packet radionet). For Ethernet, the value of field 320 is 0x0001. Protocol field 322 is two bytes and indicates the protocol being used, for example, the Internet Protocol uses the value 0x0800. HS field 324 is one byte and indicates the byte length of the Ethernet address, which in the current embodiment is 0x06. PS field 326 is one byte and indicates the byte length of the IP address, which in the current embodiment is 0x04. OP code field 328 is two bytes and indicates whether the ARP message is an ARP request or an ARP reply. Source Ethernet field 330 is six bytes and stores the Ethernet address of the source of the ARP packet. Source IP field 332 is four bytes and stores the IP address of the source of the ARP packet. Destination Ethernet field 334 is six bytes and stores the Ethernet address of the destination of the packet. Destination IP address 336 is four bytes and stores the IP address of the destination of the ARP packet. In step 102, device 76 would place its Ethernet address in field 330, the broadcast address 255.255.255.255 in source IP field 332, the broadcast Ethernet address FF:FF:FF:FF:FF:FF in the destination Ethernet address field 334 and the IP address chosen in step 100 would be placed in destination IP field 336.

When a machine receives an ARP request packet as described above, it determines whether it understands the hardware type (Ethernet), speaks the indicated protocol (Internet protocol) and the destination address matches its own address or is a broadcast message. The receiving machine enters the IP and Ethernet information into a table. The receiving machine notices that the message is an ARP request so it swaps fields, placing the destination addresses into the source fields and the source addresses into the destination fields, changes the OP code to reply, and sends the packet directly back to the source (which in this case would be broadcast). Thus, if device 76 receives a reply to its ARP packet then the chosen address is not unique. The only device that should reply to the ARP packet sent out in step 102 is a device having the address chosen in step 100.

In step 104, if device 76 receives a response to the ARP message within a reasonable time, then device 76 enters the new address into the database referenced in step 96, considers that address to be taken and proceeds to step 110. If no node responds to the ARP packet, then (in step 104) device 76 determines that the address has not already been taken and the method loops to step 106. In step 106, the method verifies whether the address under consideration is in the subnet. If it is not in the subnet, the system exits the method with an error because there are no addresses left (step 107). One reason for step 106 is to make sure that step 112 does not improperly change the subnet mask. If in step 106 it is determined that the address in question is in the subnet, the system proceeds to step 108 and determines the subnet mask and gateway address (this step is optional). The new address under consideration is now assigned as the IP address for use by device 76 (step 116). In step 118, device 76 continues to monitor communication on the subnet in order to determine whether there are any other devices using its IP address.

If, in step 104, device 76 determines that the address chosen in step 100 was already taken (because an ARP reply was received), the system determines whether any more addresses are left to choose from (step 110). That is, given the current subnet mask, are there any host numbers that have not been taken. If there are hosted numbers that have not been taken, the system loops back to step 100 and chooses the lowest host number not taken. If all the host numbers for the current subnet mask are taken, the system changes the subnet mask in step 112. That is, the system assumes that the subnet is not full, that the subnet mask is incorrect, and that the subnet is larger than the temporary subnet mask indicates. In one embodiment, changing the subnet mask in step 112 includes shifting the subnet mask one bit to the left and adding a zero as the new least significant bit. For example, a subnet mask of 255.255.255.8 would be changed to 255.255.255.0. This change reflects a doubling in the size of the estimated subnet. After changing the subnet mask in step 112, the system loops back to step 100 and chooses the lowest host number not already taken. Changing the subnet mask increases the universe of possible host numbers.

In one embodiment, the step of monitoring 118 includes looking for gratuitous ARP messages. A gratuitous ARP message can be an ARP packet sent out by a machine when it boots. The broadcast is generally done in the form of an ARP packet looking for its own IP address. If device 76 hears a gratuitous ARP request using the IP address it chose, then it has determined a conflict (step 114) and the system loops back to step 110 to choose a new address. Otherwise, device 76 continually monitors all gratuitous ARP requests.

If in step 94 of FIG. 3, the system determines that it has not received a sufficient number of responses, then it will continue to listen on the subnet for communications involving nodes on the subnet. When a communication is detected, the IP address of the communicating node on the subnet is stored. In one embodiment, step 92 will continue until either a sufficient number of IP addresses have been detected (e.g. 2) or until at least one address has been detected and a predetermined time interval has elapsed. An example of a predetermined time interval is two minutes.

Figure 3B:
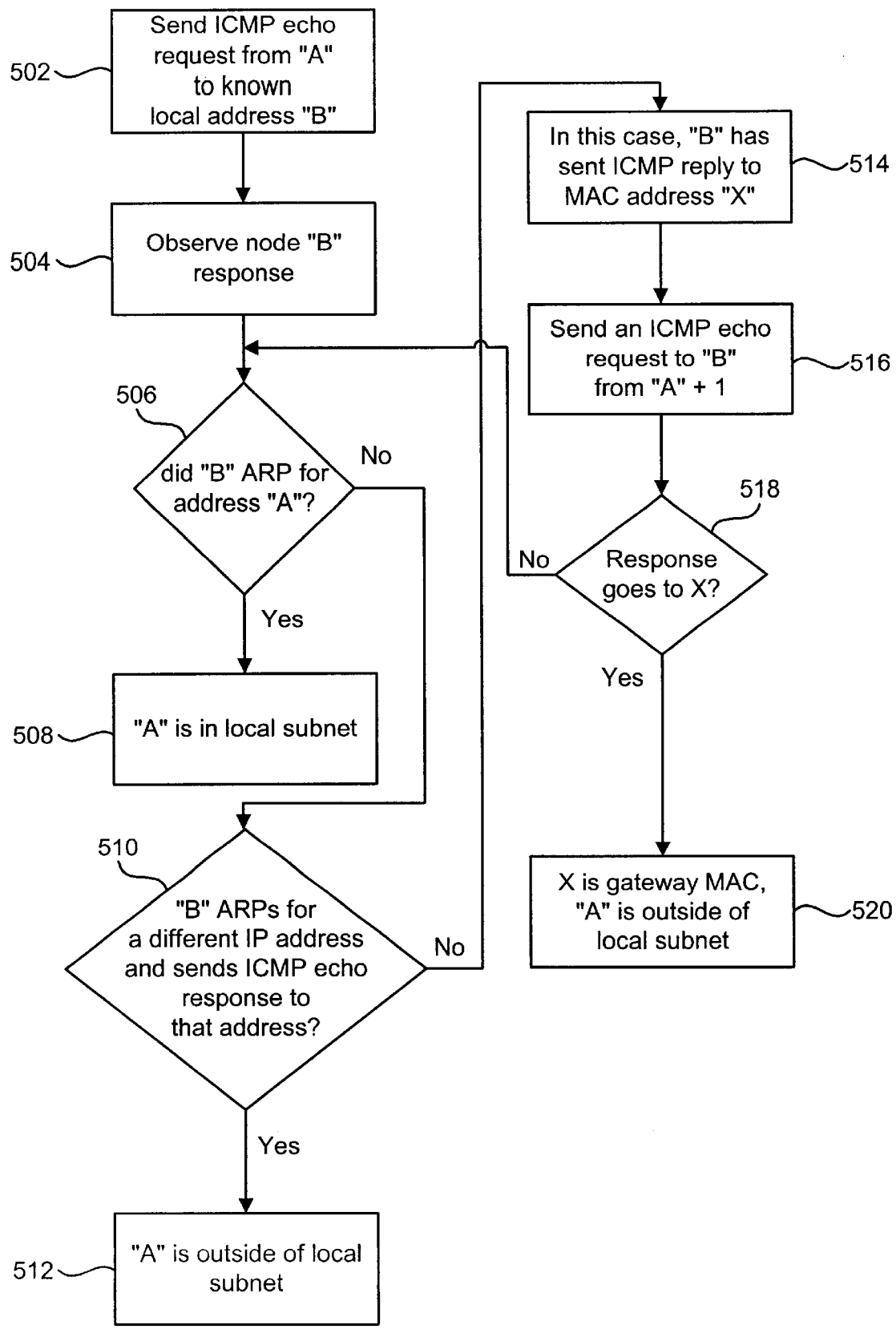
FIG. 3B is a flow chart describing the method of determining if an IP address is in a local subnet.

Step 106 of FIG. 3A includes a determination as to whether the chosen address is in the local subnet. If the address is not in the local subnet, the local subnet pool of addresses is exhausted. FIG. 3B is a flow chart explaining the method of determining whether an address is in a local subnet (step 106 of FIG. 3A).

In step 502, device 76 determines whether an address "A" is in the local subnet by sending an ICMP echo request using address "A" as its source address to one of the systems "B" that was verified as a local system in step 96. Device 76 will then observe the response from node B. There are four possible situations here:

1. "A" is local and free,
2. "A" is local and was used by another system that is currently down,
3. "A" is remote and "B" knows the gateway MAC address, and
4. "A" is remote and "B" does not know the gateway MAC address.

In the first situation ("A" is local and free), "B" will make an ARP request for the MAC (or Ethernet) address of "A." Device 76 replies to this request. If B makes such an ARP request, then the address "A" is in the local subnet (step 508).

In situation 4, entity "B" will respond to the ICMP echo request by sending an ARP request for a different IP address than A and then send an ICM? echo response to that different IP address. What "B" is doing is looking for a gateway and sending an ICMP echo request to the gateway. If in step 506 "B" is not sending an ARP request for address "A," then the system loops to step 510 to determine whether "B" sent an ARP request for the different IP address and then sent an ICMP echo response to that address. If so, then address "A" is outside the local subnet (step 512). If, in step 510, "B" did not send an ARP request for the different IP address followed by an ICMP echo response to that address, then the system loops to step 514.

In step 514, "B" sends an ICMP reply to the MAC address "X," which is an address that may not be known at this point. Step 514 is performed in situation 2 or situation 3. In both situations, "B" is attempting to respond to an entity other than "A." In situation 2, "B" is responding to another system that already uses address "A." In situation 3, "B" is responding to the gateway. In step 516, entity "A" will send an ICMP echo request to "B" using address "A"+1. Steps 516 and 518 are used to distinguish situation 2 from situation 3. In step 518, "A" determines whether the ICMP echo response from "B" (to the request in step 516) is sent to the MAC address for "X." If it is, then "X" is the MAC address for the gateway and the system determines, in step 520, that "A" is outside the local subnet. If the response in step 518 was not sent to MAC address "X," assume situation 2 and the system loops to step 506 at which time the system tests to determine whether the entity "B" sent an ARP request for the address of the origin of the ICMP echo request of step 516 (which is now address "A"+1). Basically, to distinguish between situation 2 and situation 3, device 76 will send an ICMP request to "B" using addresses A+1, A+2, . . . , up to A+N (where N is $2^{k-2}$; k is the number of bits used to identify the host ID in the subnet) and observes traffic originating from "B." If "B" continues to send ICMP replies to the same MAC address, it is deduced that the system is in situation 3 and the gateway MAC address is the repeated address. In most cases, N need not be greater than 3.

In step 108, device 76 determines the true subnet mask for the local subnet. It does this by verifying that selected addresses are within the local net, using the same approach as step 106. The system selects an address "C" that is outside of the current temporary subnet mask, and within a subnet mask that is 1 bit shorter. If "C" is within the subnet mask of the local subnet, the system continues to shorten the mask and retest it. Eventually, "C" will fall outside the local subnet mask, and the system will have determined that the local subnet mask size is one bit less than the last tested size. Step 108 ends in situation 3 or 4, listed above. In situation 4, the system will be able to extract the gateway IP address from the ARP request that "B" makes to the gateway. In situation 3, the system will have the MAC address of the gateway, which is matched to a previously ARPed address discovered in step 98.

In one alternative embodiment, device 76 can poll each device in the subnet to see if that device is a Domain Name System server. The Domain Name System (DNS) is primarily used for mapping host names and email destinations to IP addresses, but can be used for other purposes. A DNS server is a device which stores DNS information. To map a name onto an IP address, an application program calls a library procedure called a resolver, passing it a domain name as a parameter. The resolver sends a UDP packet to a local DNS server, which then looks at the name and returns a resource record (which includes the IP address) to the resolver, which then returns the IP address to the caller. Armed with the IP address, the program can then establish a TCP connection with the destination.

Every domain, whether it is a single host or a top level domain, has a set of resource records associated with it. For a single host, the most common resource record is its IP address. When a resolver process gives a domain name to the domain name system, it gets back the resource records associated with that domain name.

A resource record has five fields: domain name, time to live, class, type and value. The time to live field gives an indication of how stable the record is. Information that is highly stable is assigned a large value such as the number of seconds in a day. The third field is the class. For the Internet the class is IN. The fourth field tells the type of resource record. One domain may have many resource records. There are at least eight types of resource records that are important to this discussion: SOA, A, MX, NS, CNAME, PTR, HINFO, and TXT. The value field for an SOA record provides the name of the primary source of information about the name server zone, e-mail address of its administrator, a unique serial number and various flags and time outs in the value field. The value field for an A record holds a 32 bit IP address for the host. The value field for the MX record holds the domain name of the entity willing to accept e-mail for that particular domain name. The NS record specifies name servers. The CNAME record allows aliases to be created in the value field. A PTR record points to another name in the value field, which allows look up of an IP address for a particular domain name. The value field of the HINFO record indicates the type of machine and operating system that the domain name corresponds to. An example of resource records for a host is found below in Table 1.

TABLE 1

| Domain Name | Time to Live | Class | Type | Value |
| --- | --- | --- | --- | --- |
| saturn.ttc.com | 86400 | IN | HINFO | Sun unix |
| saturn.ttc.com | 86400 | IN | A | 188.68.70.1 |
| saturn.ttc.com | 86400 | IN | MX | mars.ttc.com |

Table 1 includes three resource records for an entity with a domain name of saturn.ttc.com. The first resource record indicates a time to live of 86,400 seconds (one day). The type of record is HINFO and the value indicates that the entity is a Sun workstation running the UNIX operating system. The second line is a resource record of type A, which indicates that the IP address for saturn.ttc.com is 198.68.70.1. The third line indicates that e-mail for saturn-.ttc.com should be sent to mars.ttc.com. It is likely that there will be a DNS record, which indicates the IP address for mars.ttc.com.

The DNS name space is divided into non-overlapping zones. Each zone is some part of the Internet space and contains name servers holding the authoritative information about that zone. Normally, a zone will have one primary DNS server and one or more secondary DNS servers which get their information from the primary DNS server. When a resolver process has a query about a domain name, it passes the query to one of the local DNS servers. If the host being sought falls under the jurisdiction of that name server, then that DNS server returns the authoritative resource record. An authoritative record is one that comes from the authority that manages the record. If, however, the host is remote and no information about the requested host is available locally, the DNS server sends a query message to the top level DNS server for the host requested. The top level DNS server will then provide the resource records to the local DNS server which may cache the information and forwarded it to the original resolver process. Since the cached information in the local DNS server is not the authoritative record, the time to live field is used to determine how long to use that information.

Figure 8:
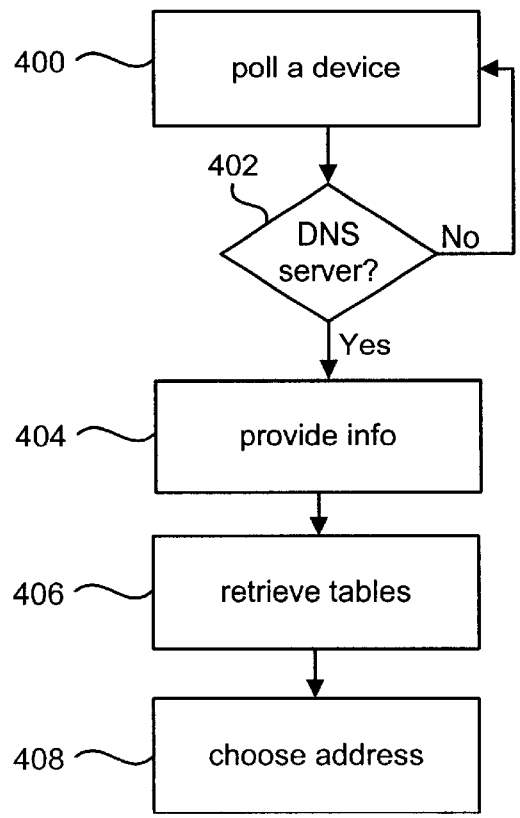
FIG. 8 is a flow chart describing the steps for utilizing a DNS server with the present invention.

FIG. 8 shows an embodiment for using a DNS server with the current invention. In step 400, device 76 polls a device on the subnet to determine whether that device is a DNS server. In one embodiment, step 400 is carried out by attempting to open up a connection with a device on port 53 using UDP or TCP. If the device responds appropriately, the device is a DNS server; otherwise, it is not. There are two ways for determining which device to poll in step 400. In one embodiment, the system chooses one of the addresses stored in the database referenced in step 96. In another embodiment, the system can simply cycle through the host IDs, using the subnet and network numbers discussed with respect to steps 98 or 112. If the device polled is not a DNS server (step 402), then the system polls the next device. If the device polled was a DNS server (step 402), then device 76 provides its DNS information to the server in step 404. In step 406, device 76 will request that the DNS server send all its tables of resource records to device 76. By receiving all the DNS tables, device 76 will be informed of all the advices on the subnet and their respective IP addresses. After reviewing the DNS tables, device 76 can choose an unused IP address for the subnet in step 408.

In the embodiment discussed above with respect to FIG. 3, the system makes an initial determination of the subnet masks in step 98. In another embodiment, the system will test for uniqueness all host numbers for a given subnet mask (e.g. send an ARP packet for each host number). Following that test, the system will shift the subnet mask one bit to the left and test all additional host numbers for that subnet mask. The process of shifting and testing will continue until a subnet mask is found for which no additional host numbers were found to be taken in the upper half of the range of host numbers for the current subnet mask. When such a situation is found, it is assumed that the subnet mask needs to be shifted over one bit to the right. If a conflict is found during the verifying or monitoring steps, device 76 does not need to change subnet masks and choose new addresses randomly. Rather, there will be a list of addresses known to be used and a list of addresses thought to be unused.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for automatically determining an address on a network, comprising the steps of:

soliciting one or more network addresses from one or more nodes on said network;

determining a seemingly unique address based on said step of soliciting, wherein said seemingly unique address does not match any address obtained in response to said step of soliciting; and verifying said seemingly unique address.

2. A method according to claim 1, wherein said step of soliciting includes soliciting all nodes on a subnet.

3. A method according to claim 1, wherein said step of soliciting includes the step of:

sending an ICMP Echo Request.

4. A method according to claim 3, wherein:

said ICMP Echo Request includes a broadcast address as its source address.

5. A method according to claim 1, further including the step of:

listening for responses from said one or more nodes.

6. A method according to claim 5, wherein said step of listening includes the step of:

receiving one or more ICMP Echo Responses.

7. A method according to claim 5, wherein said step of listening includes the step of:

listening for messages other than said responses.

8. A method according to claim 5, wherein said step of listening includes the steps of:

waiting for responses until a preset amount of time has elapsed; and listening for messages other than said responses if said preset time has elapsed.

9. A method according to claim 1, wherein said step of determining a seemingly unique address includes the step of:

determining a subnet mask.

10. A method according to claim 1, wherein said step of determining a seemingly unique address includes the step of:

determining a subnet number and a network number.

11. A method according to claim 1, further including the step of:

storing one or more network addresses received in one or more communications from said one or more nodes on said network.

12. A method according to claim 11, wherein:

each of said network addresses stored during said step of storing one or more network addresses includes a host number; and said step of determining a seemingly unique address includes the steps of:

determining a subnet number; and choosing a new host number that is different from any host numbers for any stored network addresses, said seemingly unique address includes said subnet number and said new host number.

13. A method according to claim 12, wherein said step of choosing a new host number chooses a lowest possible host number that is different from any host number for any stored network address.

14. A method according to claim 12, wherein said step of verifying includes the steps of:

sending an ARP message on the network, said ARP message having a destination address equal to said seemingly unique address;

waiting for a response to said ARP message;

storing a network address received in any response to said ARP message, if any responses to said ARP message are received; and choosing an updated host number that is different from any host number for any stored network address, if any responses to said ARP message are received.

15. A method according to claim 1, wherein said step of verifying includes the step of:

sending an ARP message on said network, said ARP message having a destination address equal to said seemingly unique address.

16. A method according to claim 15, wherein said step of verifying includes the step of:

determine a new seemingly unique address if a response to said ARP packet is received within a predetermined time period.

17. A method according to claim 1, further including the step of:

monitoring said network for conflicts with said seemingly unique address; and determining a new seemingly unique address if a conflict is found.

18. A method according to claim 17, wherein said step of monitoring includes listening for a gratuitous ARP packet that includes said new seemingly unique address.

19. A method according to claim 1, further including the steps of:

polling nodes to find a domain name server; and requesting tables from said domain name server if said domain name server is found.

20. A method according to claim 19, wherein:

said step of polling includes attempting to communicate with a node on port 53.

21. A method according to claim 1, wherein:

said network addresses and said seemingly unique address are IP version 4 addresses.

22. A method according to claim 1, wherein:

said step of soliciting includes soliciting all nodes on a subnet;

said method further includes the steps of:
  listening for responses from said one or more nodes,
  storing network addresses received in said responses, each of said network addresses includes a host number,
  monitoring said network for conflicts with said seemingly unique address, and
  determining a new seemingly unique address if a conflict is found; and said step of determining a seemingly unique address includes the steps of determining a subnet number and choosing a new host number that is different from any host numbers for any stored network addresses, said seemingly unique address includes said subnet number and said new host number.

23. A method for automatically determining an address on a subnet, comprising the steps of:

soliciting one or more subnet addresses from one or more nodes on said subnet;

determining a subnet number; and choosing a host number, based on said subnet number, that is unique among said one or more subnet addresses, said address includes said host number and said subnet number.

24. A method according to claim 23, wherein said step of soliciting includes soliciting all nodes on said subnet.

25. A method according to claim 23, wherein:

said one or more addresses include host numbers; and said step of choosing a host number includes the steps of:
  determining a subnet number; and
  choosing a host number that is different from any host numbers for any solicited addresses.

26. A processor readable storage medium having processor readable code embodied on said processor readable storage medium, said processor readable code for programming a processor to perform a method comprising the steps of:

soliciting one or more network addresses from one or more nodes on said network;

determining a seemingly unique address based on said step of soliciting, wherein said seemingly unique address does not match any address obtained in response to said step of soliciting; and verifying said seemingly unique address.

27. A processor readable storage medium according to claim 26, wherein said step of soliciting includes soliciting all nodes on a subnet.

28. A processor readable storage medium according to claim 26, wherein said step of soliciting includes the step of:

sending an ICMP Echo Request, said ICMP Echo Request includes a broadcast address as its source address.

29. A processor readable storage medium according to claim 26, wherein:

said step of determining a seemingly unique address includes the step of:
  determining a subnet mask.

30. A processor readable storage medium according to claim 26, wherein:

said method further includes the step of storing network addresses received in response to said step of soliciting;

each of said network addresses stored during said step of storing network addresses includes a host number; and said step of determining a seemingly unique address includes the steps of:
  determining a subnet number, and
  choosing a new host number that is different from any host numbers for any stored network addresses, said seemingly unique address includes said subnet number and said new host number.

31. A processor readable storage medium according to claim 30, wherein said step of verifying includes the steps of:

sending an ARP message on the network, said ARP message having a destination address equal to said seemingly unique address;

waiting for a response to said ARP message;

storing a network address received in any response to said ARP message, if any responses to said ARP message are received; and choosing an updated host number that is different from any host number for any stored network address, if any responses to said ARP messages are received.

32. A processor readable storage medium according to claim 26, wherein said method further includes the steps of:

monitoring said network for conflicts with said seemingly unique address; and determining a new seemingly unique address if a conflict is found.

33. A processor readable storage medium according to claim 26, wherein said method further includes the steps of:

polling nodes to find a domain name server; and requesting tables from said domain name serve if said domain name server is found.

34. A processor readable storage medium according to claim 26, wherein:

said network addresses and said seemingly unique address are IP version 4 addresses.

35. An apparatus capable of automatically obtaining an address on a network, comprising:

a network interface;

a processor in communication with said network interface; and memory in communication with said processor, said memory having code embodied on said memory for programming said apparatus to perform a method comprising the steps of:
  soliciting one or more network addresses from one or more nodes on said network,
  determining a seemingly unique address based on said step of soliciting,
  wherein said seemingly unique address does not match any address obtained in response to said step of soliciting, and
  verifying said seemingly unique address.

36. An apparatus according to claim 35, further comprising:
  an input device in communication with said processor; and
  an output device in communication with said processor.

37. An apparatus according to claim 35, wherein:
  said network addresses and said seemingly unique address are IP version 4 addresses.

38. An apparatus according to claim 35, wherein:
  said step of soliciting includes soliciting all nodes on a subnet.

39. An apparatus according to claim 35, wherein:
  said method further includes the step of storing network addresses received in response to said step of soliciting;
  each of said network addresses stored during said step of storing network addresses includes a host number; and
  said step of determining a seemingly unique address includes the steps of:
    determining a subnet number, and
    choosing a new host number that is different from any host numbers for any stored network addresses, said seemingly unique address includes said subnet number and said new host number.

* * * * *

UNITED STATES PATENT AND TRADEMARK OFFICE
CERTIFICATE OF CORRECTION

PATENT NO. : 6,532,217 B1
DATED : March 11, 2003
INVENTOR(S) : Alkhatib et al.

It is certified that error appears in the above-identified patent and that said Letters Patent is hereby corrected as shown below:

Column 15,
Line 58, delete the word "number" and replace with -- mask --

Signed and Sealed this

Twenty-eighth Day of December, 2004

JON W. DUDAS
*Director of the United States Patent and Trademark Office*